Jan. 9, 1962  K. R. KEYDEL  3,016,199
DEODORIZER CONTAINER
Filed July 26, 1957
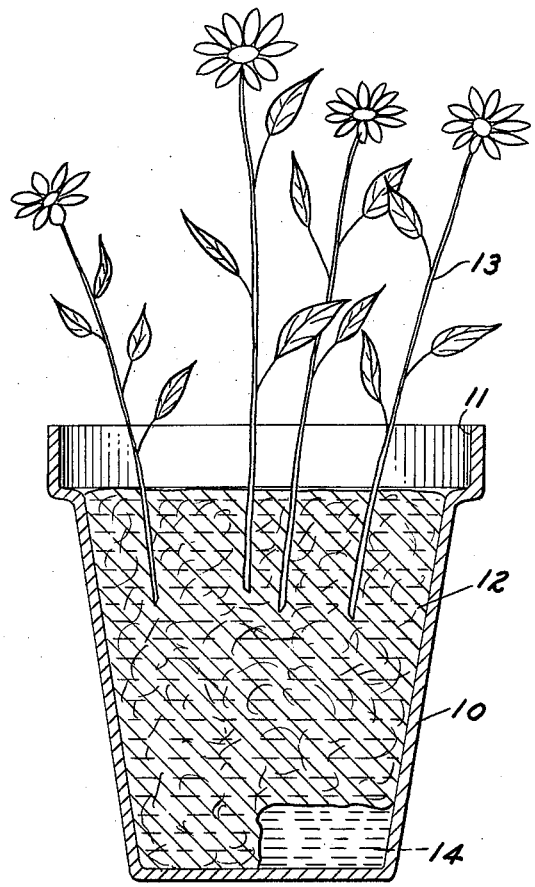
INVENTOR.
KURT R. KEYDEL
BY
ATTORNEYS

United States Patent Office 3,016,199
Patented Jan. 9, 1962

3,016,199
DEODORIZER CONTAINER
Kurt R. Keydel, 1326 E. Woodridge St., Detroit 7, Mich.
Filed July 26, 1957, Ser. No. 674,399
2 Claims. (Cl. 239—55)

This invention relates to room deodorizers and particularly to a room deodorizer which simulates a flower pot containing flowers.

It is an object of this invention to provide a deodorizer which gives the external appearance of a flower pot containing flowers.

It is a further object of this invention to provide such a deodorizer which, upon the addition of water, causes a fragrant perfume to be released to the atmosphere in order to deodorize the room.

It is a further object of this invention to provide such a deodorizer which can be rewatered in much the same manner as a plant to cause a further release of fragrant vapors into the atmosphere.

Basically, the invention comprises an open-ended container, a sponge material in the container and a deodorizing mixture comprising a non-evaporating emulsifying agent, a carrier of the pungent perfume type and a small amount of a fragrant perfume of the essential oil type.

The accompanying drawing is a sectional elevational view of a deodorizer embodying the invention.

As shown in the drawing, the flow pot 10 which has the upper end 11 only thereof open is provided with a sponge material 12 filling substantially the entire interior thereof. A plurality of artificial flowers 13 are positioned or inserted in the sponge material 12 so that they project out of the pot 10 to give the appearance of natural flowers. A deodorizing mixture 14 is poured into the pot 10. The amount of mixture 14 is only a small portion of the total interior volume of the pot 10.

The deodorizing mixture 14 comprises a non-evaporating emulsifying agent, a carrier of pungent perfume and a fragrant perfume of the essential oil type.

The emulsifying agent may be of the non-ionic type such as polyoxyethylene nonylphenol or polyoxyethylene octylphenol or may be of the an-ionic type such as sodium ricinoleate. The carrier may be of the type commonly used as an industrial deodorant and serves the purpose of extending and carrying the fragrant perfume. Satisfactory carriers comprise petroleum oil deodorant, oil of sassafrass and Terpinol absolute. Satisfactory fragrant perfumes are the essential oils of rose, rose geranium and apple blossom.

The ratio of the amount of emulsifying agent to the amount of fragrant perfume preferably ranges from 1:1 to 1:2. The amount of pungent carrier preferably ranges from 20 to 40 percent and the amount of fragrant perfume preferably ranges from 10 to 30 percent of the deodorizing mixture. The amount of emulsifying agent is preferably about 50 percent of the deodorizing mixture.

When water is added to the mixture 14 in the pot 10, an emulsion of the water and perfume oils is formed and parts of the emulsion are carried by capillary action to the surface of the sponge material 12 where evaporation of the water carries with it some of the perfume into the atmosphere thereby providing a pleasing scent which covers odors due to cooking, smoking and so forth. As the water evaporates, the emulsifying agent, being of the non-evaporating type, does not evaporate and thereby retains a substantial amount of the perfume oils. When water is again added to the deodorizer, much in the same manner as a house plant, the deodorizing process is repeated. The deodorizing process may be repeated a number of times so that the deodorizer has a substantial life.

The sponge material 12 should be of the type which provides a ready capillary action. I have found that a thickly rolled piece of felt or a thickly rolled piece of cotton produces satisfactory results. The artificial flowers may be made of parchment to simulate any desired type of flower.

It can thus be seen that I have provided a room deodorizer which gives the external appearance of a flower pot containing flowers and which, upon the addition of water in the same manner as a natural flower pot, causes perfumed vapors to be released to the atmosphere. The deodorizer is subject to reuse by the addition of water at periodic intervals.

I claim:

1. The combination comprising an open ended container, a liquid retainer made of a capillary type material positioned within said container, said retainer substantially filling said container and having a surface adjacent said open end of said container, and a deodorizing mixture within said container impregnating said liquid retainer, said deodorizing mixture comprising a fragrant oil base medium, and a non-evaporating emulsifying agent for forming an emulsion of said fragrant medium and water, the ratio of the amount of emulsifying agent to the amount of fragrant medium ranging from 1:1 to 1:2, whereby the addition of water forms an emulsion of said fragrant medium and water and the emulsion is carried by capillary action to the surface of the liquid retainer where the fragrant medium and water may be evaporated and the periodic addition of water causes a further emulsifying action of the remaining fragrant medium with water so that the replenished emulsion may be carried by capillary action to the surface of the liquid retainer.

2. The combination comprising an open ended container, a liquid retainer made of a capillary type material positioned within said container, said retainer substantially filling said container and having a surface adjacent said open end of said container, and a deodorizing mixture within said container impregnating said liquid retainer, said deodorizing mixture comprising a fragrant oil base medium, and a non-evaporating emulsifying agent for forming an emulsion of said fragrant medium and water, said fragrant medium comprising a mixture of pungent perfume and fragrant perfume, the amount of pungent perfume ranging from 20 to 40 percent, the amount of fragrant perfume ranging from 10 to 30 percent and the amount of emulsifying agent being about 50 percent, whereby the addition of water forms an emulsion of said fragrant medium and water and the emulsion is carried by capillary action to the surface of the liquid retainer where the fragrant medium and water may be evaporated and the periodic addition of water causes a further emulsifying action of the remaining fragrant medium with water so that the replenished emulsion may be carried by capillary action to the surface of the liquid retainer.

References Cited in the file of this patent

UNITED STATES PATENTS

| | | |
|---|---|---|
| 355,982 | Eggert | Jan. 11, 1887 |
| 1,580,952 | Braunlich | Apr. 13, 1926 |
| 2,471,949 | Gilowitz | May 31, 1949 |
| 2,492,039 | Gilowitz | Dec. 20, 1949 |
| 2,871,526 | Bulloff | Feb. 3, 1959 |

OTHER REFERENCES

Streatfield: Soap, Perf. and Cosmetics, August 1951, pp. 775–780, 809–811.

Poucher: Perfumes, Cos. and Soaps, D. Van Nostrand Co., N.Y. 1942, Vol. 1, pp. 367, 386, 391, Vol. II, pp. 21, 22, Vol. III, pp. 13, 17.

Manufacturing Chemist, November 1938, pp. 344, 345, 356.

Bennett: Chem. Formulary, Chem. Pub. Co., Brooklyn, Vol. IX, 1951, pp. 78, 79.